(12) United States Patent
Purdy et al.

(10) Patent No.: US 7,296,103 B1
(45) Date of Patent: **\*Nov. 13, 2007**

(54) METHOD AND SYSTEM FOR DYNAMICALLY SELECTING WAFER LOTS FOR METROLOGY PROCESSING

(75) Inventors: Matthew A. Purdy, Austin, TX (US); Cabe W. Nicksic, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 283 days.

This patent is subject to a terminal disclaimer.

(21) Appl. No.: 10/958,834

(22) Filed: Oct. 5, 2004

(51) Int. Cl.
*G06F 19/00* (2006.01)
*G05B 21/02* (2006.01)
*G05B 13/04* (2006.01)
*G05B 17/02* (2006.01)

(52) U.S. Cl. .................. 710/106; 700/121; 700/74; 438/5; 438/7; 438/14

(58) Field of Classification Search ............. 700/105, 700/100, 74, 28, 46, 108–111, 116–121, 73, 700/97; 438/5, 7, 14–18, 714, 430; 439/431, 439/8, 9; 702/81–85, 105, 122; 710/106; 257/48; 430/30
See application file for complete search history.

(56) References Cited

U.S. PATENT DOCUMENTS

| | | | |
|---|---|---|---|
| 5,402,367 A | 3/1995 | Sullivan et al. | 364/578 |
| 5,586,039 A | 12/1996 | Hirsch et al. | 364/468.01 |
| 5,620,556 A | 4/1997 | Henck | 438/8 |
| 5,657,252 A | 8/1997 | George | 364/550 |
| 5,661,669 A | 8/1997 | Mozumder et al. | 364/552 |
| 5,770,098 A | 6/1998 | Araki et al. | 216/67 |
| 5,822,218 A | 10/1998 | Moosa et al. | 364/488 |
| 5,896,294 A | 4/1999 | Chow et al. | 364/468.28 |

(Continued)

FOREIGN PATENT DOCUMENTS

| | | |
|---|---|---|
| EP | 1 420 310 A2 | 5/2004 |
| WO | WO 02/103778 A2 | 12/2002 |

OTHER PUBLICATIONS

"Modular metrology tools for productivity enhancement in wafer fabs" by Schneider et al. (abstract only) Publication Date: Oct. 6-8, 1997.*

(Continued)

*Primary Examiner*—Gopal C. Ray
(74) *Attorney, Agent, or Firm*—Williams, Morgan & Amerson

(57) ABSTRACT

The present invention is generally directed to various methods and systems for dynamically controlling metrology work in progress. In one illustrative embodiment, the method comprises providing a metrology control unit that is adapted to control metrology work flow to at least one metrology tool, identifying a plurality of wafer lots that are in a metrology queue wherein the wafer lots are intended to be processed in at least one metrology tool, and wherein the metrology control unit selects at least one of the wafer lots for metrology processing in the at least one metrology tool and selects at least one other of the plurality of wafer lots to be removed from the metrology queue based upon the metrology processing of the selected at least one wafer lot in the at least one metrology tool.

22 Claims, 3 Drawing Sheets

U.S. PATENT DOCUMENTS

| | | | |
|---|---|---|---|
| 5,982,920 A | 11/1999 | Tobin, Jr. et al. | 382/145 |
| 5,999,003 A | 12/1999 | Steffan et al. | 324/537 |
| 6,002,989 A | 12/1999 | Shiba et al. | 702/84 |
| 6,027,842 A * | 2/2000 | Ausschnitt et al. | 430/30 |
| 6,136,712 A | 10/2000 | Klippert, II et al. | 438/692 |
| 6,166,801 A | 12/2000 | Dishon et al. | 355/27 |
| 6,171,174 B1 * | 1/2001 | Campbell et al. | 451/5 |
| 6,245,581 B1 | 6/2001 | Bonser et al. | 438/8 |
| 6,248,602 B1 | 6/2001 | Bode et al. | 438/14 |
| 6,263,255 B1 | 7/2001 | Tan et al. | 700/121 |
| 6,281,962 B1 | 8/2001 | Ogata et al. | 355/27 |
| 6,303,395 B1 | 10/2001 | Nulman | 439/14 |
| 6,337,217 B1 | 1/2002 | Hause et al. | 438/7 |
| 6,374,199 B1 | 4/2002 | Sugimoto | 703/2 |
| 6,403,385 B1 | 6/2002 | Venkatkrishnan | 438/14 |
| 6,408,219 B2 | 6/2002 | Lamey, Jr. et al. | 700/110 |
| 6,421,574 B1 | 7/2002 | Steffan et al. | 700/121 |
| 6,442,496 B1 | 8/2002 | Pasadyn et al. | 702/83 |
| 6,444,481 B1 * | 9/2002 | Pasadyn et al. | 438/5 |
| 6,461,878 B1 | 10/2002 | Lansford | 438/14 |
| 6,469,518 B1 | 10/2002 | Davis et al. | 324/600 |
| 6,477,432 B1 | 11/2002 | Chen et al. | 700/51 |
| 6,526,547 B2 | 2/2003 | Breiner et al. | 716/4 |
| 6,577,972 B2 | 6/2003 | Yanaru et al. | 702/83 |
| 6,587,744 B1 * | 7/2003 | Stoddard et al. | 700/121 |
| 6,650,955 B1 | 11/2003 | Sonderman et al. | 700/108 |
| 6,662,076 B1 * | 12/2003 | Conboy et al. | 700/214 |
| 6,687,561 B1 | 2/2004 | Pasadyn et al. | 700/110 |
| 6,708,129 B1 * | 3/2004 | Pasadyn et al. | 702/81 |
| 6,746,616 B1 * | 6/2004 | Fulford et al. | 216/59 |
| 6,821,792 B1 | 11/2004 | Sonderman et al. | 438/5 |
| 6,907,369 B1 * | 6/2005 | Markle et al. | 702/81 |
| 6,985,794 B1 * | 1/2006 | Conboy et al. | 700/214 |
| 6,988,045 B2 * | 1/2006 | Purdy | 702/83 |
| 7,067,333 B1 * | 6/2006 | Pasadyn et al. | 438/5 |
| 7,069,103 B1 * | 6/2006 | Bode et al. | 700/121 |
| 7,076,321 B2 * | 7/2006 | Purdy | 700/121 |
| 7,102,763 B2 * | 9/2006 | Ritzdorf et al. | 356/630 |
| 2002/0193899 A1 | 12/2002 | Shanmugasundram | 700/108 |
| 2004/0038454 A1 | 2/2004 | Coldren et al. | 438/122 |
| 2004/0059456 A1 * | 3/2004 | Bode et al. | 700/121 |
| 2004/0173464 A1 | 9/2004 | Parikh et al. | 205/157 |
| 2005/0021272 A1 * | 1/2005 | Jenkins et al. | 702/105 |
| 2005/0136560 A1 * | 6/2005 | Helwig | 438/14 |
| 2005/0187649 A1 * | 8/2005 | Funk et al. | 700/121 |
| 2005/0205776 A1 * | 9/2005 | Dana et al. | 250/306 |
| 2006/0178767 A1 * | 8/2006 | Lee et al. | 700/109 |

OTHER PUBLICATIONS

Williams et al., "Optimized Sample Planning for Wafer Defect Inspection," 1999 IEEE.

McIntyre et al., "Key Considerations in the Development of Defect Sampling Methodologies," 1996 IEEE.

* cited by examiner

METHOD AND SYSTEM FOR DYNAMICALLY SELECTING WAFER LOTS FOR METROLOGY PROCESSING

BACKGROUND OF THE INVENTION

1. Field of the Invention

This invention relates generally to an industrial process, and, more particularly, to various methods and systems for dynamically controlling metrology work in progress.

2. Description of the Related Art

After a complete reading of the present application, those skilled in the relevant art will understand that the present invention has broad application to a variety of industries involving the manufacture of a variety of different types of devices or workpieces. By way of example only, the background of the application will be discussed in the context of various problems encountered in the manufacture of integrated circuit devices. However, the present invention is not to be considered as limited to use only within the semiconductor manufacturing industry.

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more quickly and more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a lot of wafers using a variety of process tools, including photolithography steppers, etch tools, deposition tools, polishing tools, thermal anneal process tools, implantation tools, etc. The technologies underlying semiconductor process tools have attracted increased attention over the last several years, resulting in substantial refinements. However, despite the advances made in this area, many of the process tools that are currently commercially available suffer certain deficiencies. In particular, some of such tools often lack advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These deficiencies can engender non-optimal control of critical processing parameters, such as throughput, accuracy, stability and repeatability, processing temperatures, mechanical tool parameters, and the like. This variability manifests itself as within-run disparities, run-to-run disparities and tool-to-tool disparities that can propagate into deviations in product quality and performance, whereas an ideal monitoring and diagnostics system for such tools would provide a means of monitoring this variability, as well as providing means for optimizing control of critical parameters.

One technique for improving the operation of a semiconductor processing line includes using a factory wide control system to automatically control the operation of the various process tools. The manufacturing tools communicate with a manufacturing frame-work or a network of processing modules. Each manufacturing tool is generally connected to an equipment interface. The equipment interface is connected to a machine interface that facilitates communications between the manufacturing tool and the manufacturing frame-work. The machine interface can generally be part of an advanced process control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices.

During the fabrication process various events may take place that affect the performance of the devices being fabricated. That is, variations in the fabrication process steps may result in variations of the features that comprise the device as well as device performance variations. Factors, such as feature critical dimensions, doping levels, contact resistance, particle contamination, etc., all may potentially affect the end performance of the device. Various tools in the processing line are controlled in accordance with performance models to reduce processing variation. Commonly controlled tools include photolithography steppers, polishing tools, etching tools, and deposition tools. Pre-processing and/or post-processing metrology data is supplied to process controllers for the tools. Operating recipe parameters, such as processing time, are calculated by the process controllers based on the performance model and the metrology information to attempt to achieve post-processing results as close to a target value as possible. Reducing variation in this manner leads to increased throughput, reduced cost, higher device performance, etc., all of which equate with increased profitability.

Target values for the various processes performed are generally based on design values for the devices being fabricated. For example, a particular process layer may have a target thickness. Operating recipes for deposition tools and/or polishing tools may be automatically controlled to reduce variation about the target thickness. In another example, the critical dimensions of a transistor gate electrode may have an associated target value. The operating recipes of photolithography tools and/or etch tools may be automatically controlled to achieve the target critical dimensions.

Typically, a control model is used to generate control actions for changing the operating recipe settings for a process tool being controlled based on feedback or feedforward metrology data collected related to the processing by the process tool. To function effectively, a control model must be provided with metrology data in a timely manner and at a quantity sufficient to maintain its ability to predict the future operation of the process tool it controls.

Within many manufacturing industries great effort is made to insure that processing operations are performed accurately such that the resulting device meets target specifications. This is particularly true within the semiconductor manufacturing industry wherein many metrology tools and sensors are used to acquire a vast amount of metrology data to determine the effectiveness and accuracy of the processing operations performed in a process tool and/or the compliance of the resulting workpiece with product specifications. To that end, a typical semiconductor manufacturing facility may devote a great deal of resources to obtaining such metrology data. Typically, a modern semiconductor manufacturing facility will have many metrology tools or stations where a variety of metrology operations are performed. Illustrative metrology data may include the thickness of a process layer, a critical dimension of a feature formed above a substrate, a planarity of a surface, etc. Some metrology tools are dedicated to performing only one type of metrology operations, e.g., critical dimension measurements, whereas other metrology tools are capable of performing multiple metrology operations. Moreover, a typical semiconductor manufacturing facility may have multiple tools capable of performing the same metrology operation.

In semiconductor manufacturing environments, metrology sampling rates are established for various process operations. The sampling rates may vary depending upon a variety of factors, such as the criticality of the particular process, e.g., gate etch processes, and/or how stable the process operations are in terms of controllability. In semiconductor manufacturing environments, metrology sampling rates are typically set below a level where the aggregate of all of the products selected for sampling would completely utilize all available metrology capacity. This may generally be referred to as baseline sampling rates. The base-line sampling rates are set at less than maximum levels to allow the metrology tools to "catch-up" to accumulated work-in-progress (WIP) after one or more of the metrology tools have been taken out of service for a variety of reasons, e.g., routine maintenance, an unscheduled problem with one of the metrology tools, etc. For example, if one out of four available metrology tools is taken out of service, the work-in-progress (WIP) would slowly accumulate in the metrology queues until the out-of-service metrology tool is returned to service. At that time, all four of the available metrology tools would operate at higher than normal utilization rates until the work-in-progress (WIP) queues are reduced to normal.

Despite such efforts to control metrology operations, work in progress (WIP) can accumulate for metrology operations. That is, for a variety of reasons, work in progress queues for various metrology operations can exceed the available capacity of the metrology tools. A variety of actions may be taken to reduce the metrology work in progress or metrology queue. For example, metrology sampling rates may be reduced until such time as the metrology queue is reduced to acceptable levels. However, such a methodology results in the acquisition of less metrology data regarding the effectiveness of various process operations performed in the manufacturing facility. As a result, problems within the manufacturing facility may not be detected as quickly as would otherwise be desired. Accordingly, production yields and manufacturing efficiencies may be reduced using such a method of reducing metrology work in progress.

The present invention is directed to overcoming, or at least reducing the effects of, one or more of the problems set forth above.

SUMMARY OF THE INVENTION

The present invention is generally directed to various methods and systems for dynamically controlling metrology work in progress. In one illustrative embodiment, the method comprises providing a metrology control unit that is adapted to control metrology work flow to at least one metrology tool, identifying a plurality of wafer lots that are in a metrology queue wherein the wafer lots are intended to be processed in at least one metrology tool, and wherein the metrology control unit selects at least one of the wafer lots for metrology processing in the at least one metrology tool and selects at least one other of the plurality of wafer lots to be removed from the metrology queue based upon the metrology processing of the selected at least one wafer lot in the at least one metrology tool.

In another illustrative embodiment, the method comprises providing a metrology control unit that is adapted to control metrology work flow to at least one metrology tool, identifying a plurality of wafer lots that are in a metrology queue wherein the wafer lots are intended to be processed in at least one metrology tool, wherein the metrology control unit: (a) selects at least one of the wafer lots for metrology processing in the at least one metrology tool, said selected at least one lot being subjected to a previous process operation; and (b) selects at least one other of the plurality of wafer lots subjected to the process operation at a time prior to the selected at least one wafer lot to be removed from the metrology queue based upon the metrology processing of the selected at least one wafer lot in the at least one metrology tool.

BRIEF DESCRIPTION OF THE DRAWINGS

The invention may be understood by reference to the following description taken in conjunction with the accompanying drawings, in which like reference numerals identify like elements, and in which.

Figure 1:
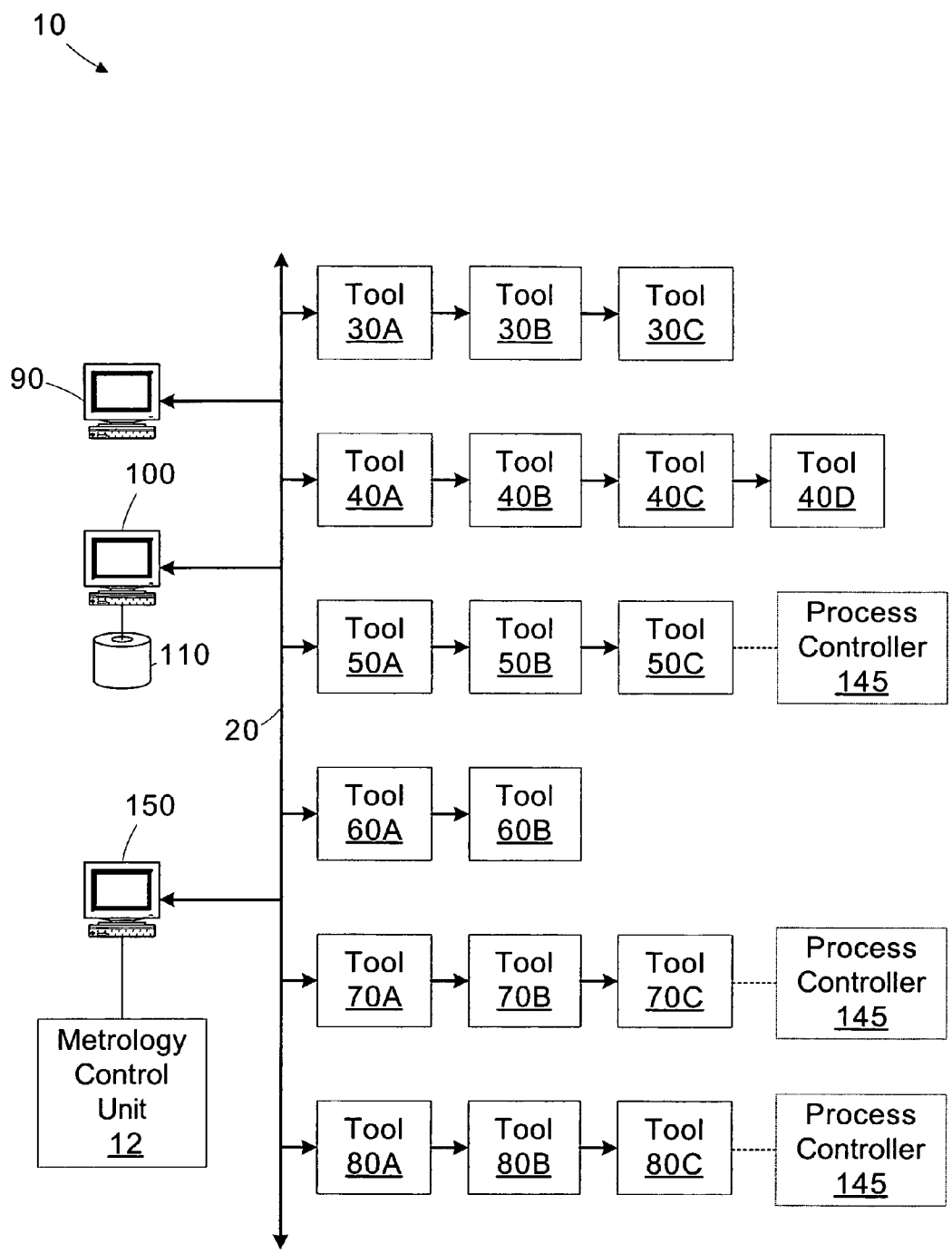
FIG. 1 is a simplified block diagram of a manufacturing system in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Various structures systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring to FIG. 1, a simplified block diagram of an illustrative manufacturing system 10 is provided. In the illustrated embodiment, the manufacturing system 10 is adapted to fabricate semiconductor devices. Although the invention is described as it may be implemented in a semiconductor fabrication facility, the invention is not so limited and may be applied to other manufacturing environments. The techniques described herein may be applied to a variety of workpieces or manufactured items. For example, the present invention may be employed in connection with the manufacture of a variety of integrated circuit devices, including, but not limited to, microprocessors, memory devices, digital signal processors, application specific integrated circuits (ASICs), or other devices. The techniques may also be applied to workpieces or manufactured items other than integrated circuit devices.

A network 20 interconnects various components of the manufacturing system 10, allowing them to exchange information. The illustrative manufacturing system 10 includes a plurality of tools 30-80. Each of the tools 30-80 may be coupled to a computer (not shown) for interfacing with the network 20. The tools 30-80 are grouped into sets of like tools, as denoted by lettered suffixes. For example, the set of tools 30A-30C represent tools of a certain type, such as a chemical mechanical planarization tool. A particular wafer or lot of wafers progresses through the tools 30-80 as it is being manufactured, with each tool 30-80 performing a specific function in the process flow. Exemplary processing tools for a semiconductor device fabrication environment include metrology tools, photolithography steppers, etch tools, deposition tools, polishing tools, rapid thermal anneal tools, implantation tools, etc. The tools 30-80 are illustrated in a rank and file grouping for illustrative purposes only. In an actual manufacturing facility, the tools 30-80 may be arranged in any physical order or grouping. Additionally, the connections between the tools in a particular grouping are meant to represent connections to the network 20, rather than interconnections between the tools 30-80.

A manufacturing execution system (MES) server or controller 90 directs high level operation of the manufacturing system 10. The MES server 90 may monitor the status of the various entities in the manufacturing system 10 (i.e., lots, tools 30-80) and control the flow of articles of manufacture (e.g., lots of semiconductor wafers) through the process flow. A database server 100 is provided for storing data related to the status of the various entities and articles of manufacture in the process flow. The database server 100 may store information in one or more data stores 110. The data may include pre-process and post-process metrology data, tool states, lot priorities, operating recipes, etc. The controller 90 may also provide operating recipes to one or more of the tools depicted in FIG. 1 or command that various operating recipes be performed in one or more of the tools. Of course, the controller 90 need not perform all of these functions. Moreover, the functions described for the controller 90 may be performed by one or more computers spread throughout the system 10.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

The manufacturing system 10 also includes a metrology control unit 12 executing on an illustrative workstation 150. The metrology control unit 12 may be used to control various metrology tools employed in connection with manufacturing operations performed in the manufacturing system 10. The metrology control unit 12 may communicate with the controller 90 and/or with one or more process controllers 145 associated with the individual tools 30-80 for purposes to be described later herein. The particular control models used by the process controllers 145 depend on the type of tool 30-80 being controlled. The control models may be developed empirically using commonly known linear or non-linear techniques. The control models may be relatively simple equation-based models (e.g., linear, exponential, weighted average, etc.) or a more complex model, such as a neural network model, principal component analysis (PCA) model, partial least squares projection to latent structures (PLS) model. The specific implementation of the control models may vary depending on the modeling techniques selected and the process being controlled. The selection and development of the particular control models would be within the ability of one of ordinary skill in the art, and accordingly, the control models are not described in greater detail herein for clarity and to avoid obscuring the instant invention.

An exemplary information exchange and process control framework suitable for use in the manufacturing system 10 is an Advanced Process Control (APC) framework, such as may be implemented using the Catalyst system formerly offered by KLA-Tencor, Inc. The Catalyst system uses Semiconductor Equipment and Materials International (SEMI) Computer Integrated Manufacturing (CIM) Framework compliant system technologies and is based the Advanced Process Control (APC) Framework. CIM (SEMI E81-0699—Provisional Specification for CIM Framework Domain Architecture) and APC (SEMI E93-0999-Provisional Specification for CIM Framework Advanced Process Control Component) specifications are publicly available from SEMI, which is headquartered in Mountain View, Calif.

The processing and data storage functions are distributed amongst the different computers or workstations in FIG. 1 to provide general independence and central information storage. Of course, different numbers of computers and different arrangements may be used without departing from the spirit and scope of the instant invention.

Figure 2:
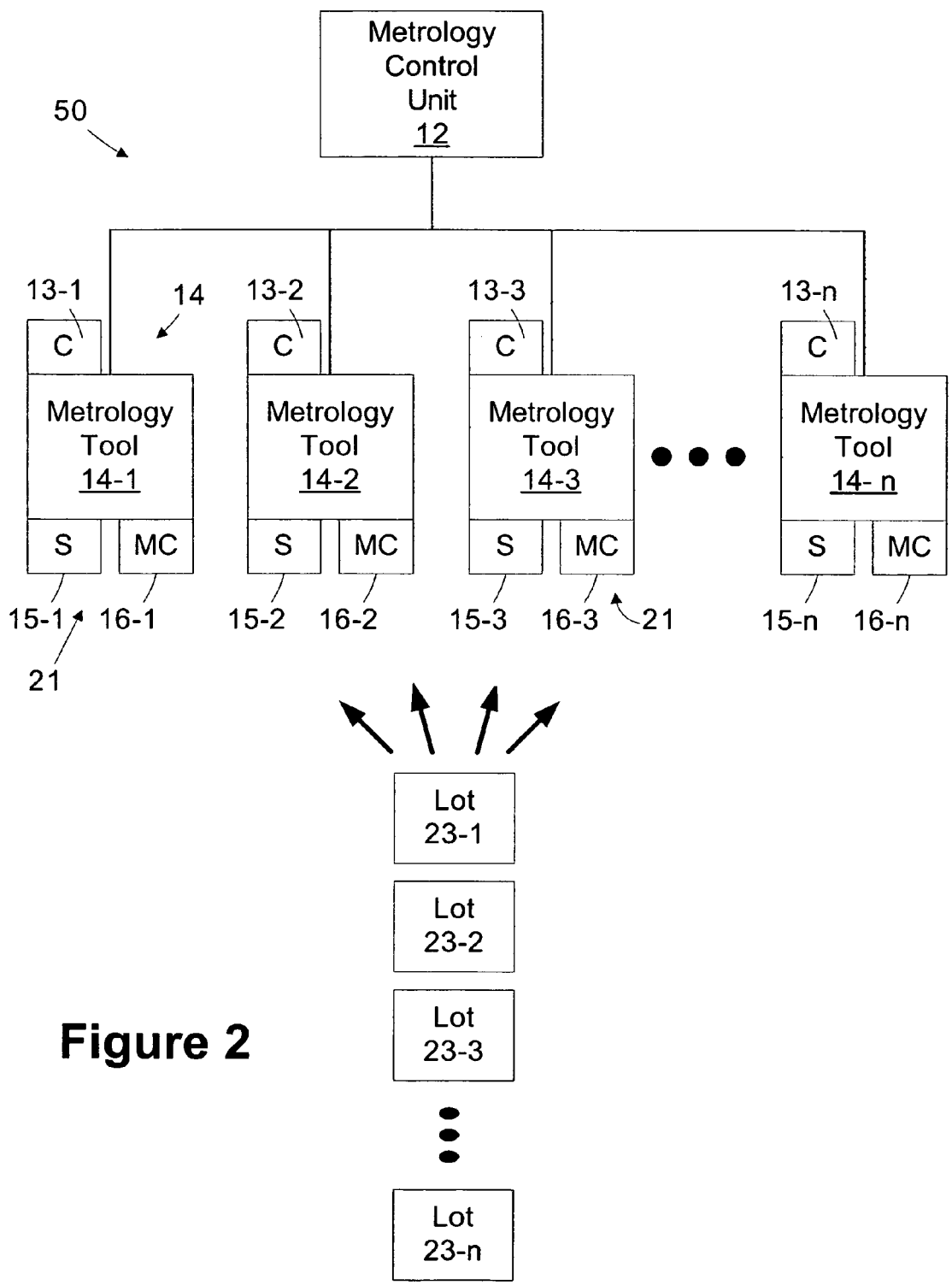
FIG. 2 is a simplified block diagram of a more detailed depiction of a system in accordance with one illustrative embodiment of the present invention.
Figure 3:
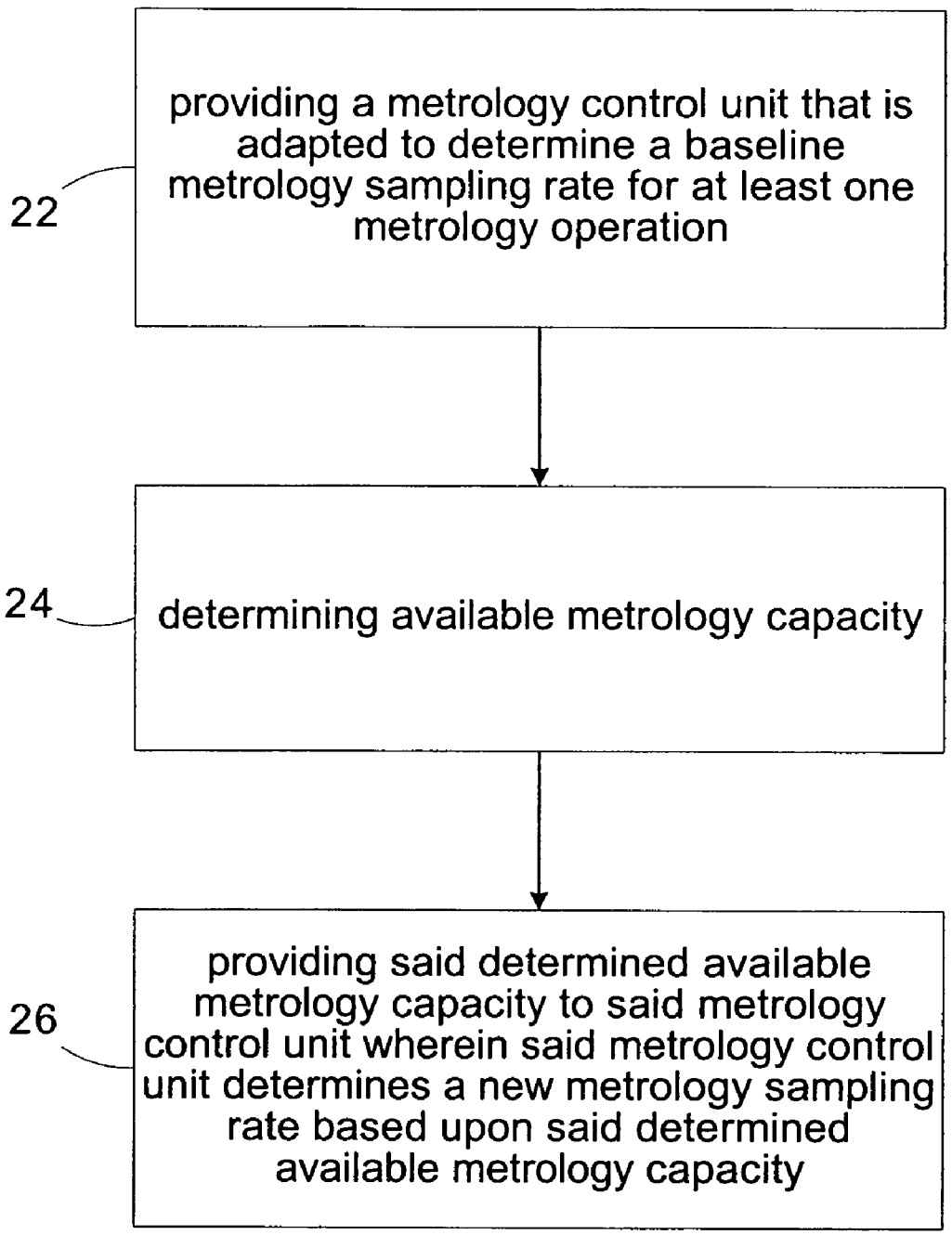
FIG. 3 is a simplified flow diagram of a method of controlling metrology operations in accordance with one illustrative embodiment of the present invention.

FIG. 2 is a more specific, simplified block diagram of a metrology system 50 in accordance with one illustrative embodiment of the present invention. As shown therein, the metrology control unit 12 is operatively coupled to a plurality of metrology tools 14. In the illustrative embodiment, four such illustrative metrology tools, 14-1, 14-2, 14-3 and 14-n are schematically depicted. However, the present invention may be employed with any such number of metrology tools. The illustrative metrology tools 14 may perform one or more of a variety of metrology operations. For example, the metrology tools 14 may perform metrology operations such as measuring the thickness of a process layer, measuring a critical dimension of a feature, measuring the planarity of a surface, film resistivity, film optical properties (e.g., n and k), defectivity, overlay alignment, etc.

Also depicted in FIG. 2 are a plurality of wafer lots 23-1, 23-2, 23-3 and 23-n that are to be subjected to one or more metrology operations performed in one or more of the metrology tools 14. The lots contain a plurality, e.g., 20-25, of semiconducting substrates that will be generically referred to as wafers. The lots 23 are intended to be representative in nature. Typically, the lots 23 are at the stage of manufacturing where at least one process operation has been performed on the wafers within each lot 23, and it is desired to perform at least one metrology operation on the wafers in the lots 23 on one or more of the metrology tools. Any of a variety of different process operations may be performed on the wafers within the lots 23, e.g., a deposition process, an etch process, an anneal process, a chemical mechanical polishing process, an ion implant or diffusion process, a photolithography process, etc.

The metrology system 50 may be employed to monitor and control work in progress, i.e., the metrology queue, for the metrology tools 14. In some cases, the metrology tools 14 perform generally the same type of metrology operation, e.g., measuring the thickness of a layer, measuring the critical dimension of a feature, etc. However, the metrology tools 14 are not necessarily completely interchangeable for all metrology operations. For example, if there are two metrology tools 14 and three metrology operations, it is not required that each of the two metrology tools 14 can be used for each of the three metrology operations.

The metrology control unit 12 has the capability to control and determine which lots 23 will be processed in the metrology tool 14. In accordance with one aspect of the present invention, the metrology control unit 12 may be employed to manage and control accumulated work in progress for the various metrology tools 14, as described more fully below. In general, the metrology control unit 12 may be used to selectively determine which of the lots 23 are processed in one or more of the metrology tools 14 based upon various rules and logic. This allows the metrology tools 14 to be used in an efficient manner and also improves the flow of the wafer lots 23 through the manufacturing facility, which may lead to improved manufacturing efficiencies and product yields.

In general, the metrology control unit 12 may be employed to control accumulated metrology work in progress by eliminating or reducing redundant metrology operations and/or by selectively processing some of the wafer lots 23 in the metrology tools 14 in such a manner that planned metrology operations on other lots 23 may not be required. For example, in one embodiment, there may be a plurality of lots 23 that are in queue for the same metrology operation, i.e., a plurality of lots are sent to the metrology tools 14 for measurement of the critical dimension of gate electrode structures formed on the wafers. Moreover, these wafer lots 23 may have been processed at a variety of different times and/or on different process tools, e.g., different etch tools. Accordingly, performing metrology operations on all of the lots 23 sent to the metrology tool 14 may be unnecessary and wasteful of scarce metrology resources. To that end, the present invention may be employed to eliminate or "bracket-out" some of the lots 23 intended for metrology operations in one or more of the metrology tools 14. That is, the present invention may be employed to intelligently reduce work in progress levels at the various metrology tools 14 while at the same time insuring that sufficient metrology data is obtained to accurately monitor processing operations performed in the manufacturing facility.

In one aspect, each of the lots 23 to be processed by one or more of the metrology tools 14 is identified with a lot number, a time stamp and a list of metrology rules associated with each lot. This identifying information may be used by the metrology control unit 12 to take various control actions. Of course, the identifying information may be in any desired format or configuration, and the identifying information may include more or less information than the specific items identified above. For example, in one embodiment, the identifying information for a given lot 23 may take the following form:

| Lot # | Time Stamp | Matching Rules |
|---|---|---|
| J20 | 2004 0130 02:37:42 | ET40M1CD R02M1CD |
| |   |   |   | | |
| | Year Date Time | | where the time stamp indicates the time at which a previous process operation was performed on the subject wafer lot. ET40M1CD reflects a metal one critical dimension (M1CD) metrology operation is to be performed on a lot processed in etch tool number 40 (ET40). The second rule R02M1CD reflects a metal one critical dimension (M1CD) metrology operation is to be performed on a lot processed through a lithography process using reticle number 2 (R02). A single lot may satisfy several metrology rules.

In accordance with one aspect of the present invention, lots 23 may be removed or "bracketed-out" of the metrology work in progress for a variety of reasons, e.g., the intended metrology operations may be redundant if other lots are processed in the metrology tools 14 and/or more recently processed lots are in the metrology queue. The following table provides an illustrative example:

| Lot # | Time Stamp | Matching Rules |
|---|---|---|
| J20 | 2004 0103 02:37:42 | ET40M1CD R02M1CD |
| J30 | 2004 0103 03:05:02 | ET39M1CD R02M1CD |
| J40 | 2004 0103 03:42:55 | ET40M1CD S64M1CD | where ET39 represents etch tool number 39, S64 represents stepper tool number 64, and the other information is as indicated above. In this illustrative example, if all of the lots were in the metrology queue, in accordance with the present invention, lot J20 could be taken out of metrology queue if desired or needed. Lot J20 may be removed because every metrology rule satisfied by lot. J20 is matched or equally satisfied by a more recently processed lot, as indicated by the later time stamp, in the metrology queue. That is, the lot J30 matches the R02M1CD rule of the lot J20, and the lot J40 matches the E40M1CD rule of the lot J20. Thus, metrology operations need not be performed on the lot J20 as lots with later time stamps satisfy all of the metrology operations and rules associated with lot J20. Of course, if desired, it may be decided that the metrology operations to be performed on lot J20 may simply be delayed instead of completely eliminated. That is, the lot J20 could wait until metrology work in progress levels are reduced to a low enough level that the lot J20 may now be processed in the metrology tools 14. However, in one embodiment, once the lot J20 is "bracketed-out" using the present invention, the metrology operations to be performed on lot J20 are simply not performed and lot J20 is sent downstream where additional process operations are performed on the wafers within the lot J20.

As another example, rules for metrology sampling can be specified for EACH processing tool or ANY processing tools at a specified processing operation. A rule set up for EACH processing tool guarantees sampling by each individual processing tool. A rule set up for ANY processing tool guarantees sampling by at least one of the processing tools. If a rule is defined for EACH processing tool, when a lot successfully passes the metrology operation, any other lots that (1) have not yet entered the metrology tools for processing and (2) were processed on the processing tool prior to the processing time of the lot that passed the metrology operation would be automatically bracketed and removed from the metrology queue. Note that, if the metrology rule for ANY processing tool was used, when the first lot successfully passed the metrology operation, all other lots that were processed at the specified processing operation prior to the lot would be removed from the metrology queue irrespective of what tool was used.

The present invention may also employ various constraints or additional rules in connection with the methodologies described herein. For example, initially it will need to be decided if a given metrology operation or rule is subject to the bracketing methodologies described herein. A given process operation may be so critical that bracketing out or not performing metrology operations of lots 23 subjected to this critical operation cannot be tolerated. In that case, the methodologies described herein would not be applied to such critical lots 23 in the metrology queues. An appropriate identifier may be associated with such lots such that the metrology control unit recognizes that these critical lots 23 may not be removed from the metrology queue for any reason.

Another issue to address is the appropriate criteria for a sampled lot to be considered an acceptable representative for purposes of removing or bracketing out other lots from the metrology queue. In general, lots are considered to be representative if they exhibit the characteristics of the majority of lots 23 processed within the facility. The exact parameters of what qualifies as a representative lot may vary depending upon the particular application. For example, in one illustrative embodiment, a representative lot would typically be a lot that has a full cassette of wafers that does not have any special characteristics or purposes, e.g., a special lot requested by engineering to test a new process or tool, etc.

In another aspect of the present invention, a limit may be established for the number of lots 23 that may be skipped or bracketed out using the present invention. Such a limit may be employed to insure that an excessively large number of lots 23 do not bypass metrology operations. For example, the metrology queue for a particular metrology operation (e.g., CD measurement) may contain twenty lots from etch tool 40 (ET40). Such a large queue may be due to a variety of reasons, e.g., scheduled maintenance or emergency shutdown of one or more of the metrology tools 14 that are capable of performing the metrology operation. In that case, once CD metrology operations are resumed, absent a limit, inspection of the most recently processed of the twenty lots would bracket or remove the earlier nineteen lots. If a limit is established such that no more than four consecutive lots are skipped, then inspection of lot 20 would only bracket out or remove lots 16-19. Inspection of lot 15 would bracket out lots 11-14, inspection of lot 10 would bracket out lots 6-9, and inspection of lot 5 would bracket out lots 1-4. A separate limit number could be added to the metrology rule for this purpose. A default limit rule may also be employed, e.g., 10 lots, if desired.

The present invention may also be subject to special rules that account for the occurrence of special events that may impact the actions taken by the metrology control unit 12. For example, if preventative maintenance operations have recently been performed on a process tool or a metrology tool, it may be desirable to insure that metrology operations are performed on a selected number of lots 23 processed through the subject tool before the metrology control unit 12 can perform the bracketing activities described herein. The number selected may vary depending on the particular tool and/or type of event. Based upon the occurrence of such a special event, the metrology control unit 12 may exempt from bracketing lots processed in the subject tool until such time as metrology operations have been performed on the specified number of lots that were processed in the subject tool. After this selected number of lots 23 have been processed through metrology, the control unit 12 may then allow subsequent lots processed through the subject tool to be bracketed in accordance with the present invention.

The bracketing algorithm described herein may be operated continuously or intermittently. For example, the methodologies described herein may be always on, may be activated when metrology work in progress exceeds a preselected level or when downstream processing work in progress levels are too low. The bracketing algorithm described herein may also be suspended as desired.

The present invention is generally directed to various methods and systems for dynamically controlling metrology work in progress. In one illustrative embodiment, the method comprises providing a metrology control unit that is adapted to control metrology work flow to at least one metrology tool, identifying a plurality of wafer lots that are in a metrology queue wherein the wafer lots are intended to be processed in at least one metrology tool, and wherein the metrology control unit selects at least one of the wafer lots for metrology processing in the at least one metrology tool and selects at least one other of the plurality of wafer lots to be removed from the metrology queue based upon the metrology processing of the selected at least one wafer lot in the at least one metrology tool. In a further embodiment, the method comprises performing metrology operations on a plurality of additional wafer lots.

In another illustrative embodiment, the method comprises providing a metrology control unit that is adapted to control metrology work flow to at least one metrology tool, identifying a plurality of wafer lots that are in a metrology queue wherein the wafer lots are intended to be processed in at least one metrology tool, wherein the metrology control unit: (a) selects at least one of the wafer lots for metrology processing in the at least one metrology tool, wherein the selected at least one lot was subjected to a previous process operation; and (b) selects at least one other of the plurality of wafer lots subjected to the process operation at a time prior to the selected at least one wafer lot to be removed from the metrology queue based upon the metrology processing of the selected at least one wafer lot in the at least one metrology tool.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
   providing a metrology control unit that is adapted to control metrology work flow to at least one metrology tool;
   identifying a plurality of wafer lots that are in a metrology queue wherein the wafer lots are intended to be processed in said at least one metrology tool; and
   wherein said metrology control unit selects at least one of said wafer lots for metrology processing in said at least one metrology tool and selects at least one other of said plurality of wafer lots to be removed from said metrology queue based upon the metrology processing of said selected at least one wafer lot in said at least one metrology tool.

2. The method of claim 1, wherein said at least one metrology tool is adapted to perform at least one metrology operation.

3. The method of claim 1, wherein each of said plurality of wafer lots has associated therewith a unique lot identification number, a time mark indicating a date and time when a previous process operation was performed on said lot, and at least one metrology rule, each rule indicating a type of metrology operation to be performed on said lot and a processing entity where a previous process operation was performed on said lot.

4. The method of claim 1, wherein said selection of said at least one wafer lot for metrology processing in said at least one metrology tool is based upon how recently a lot in said metrology queue was subjected to a previous process operation.

5. The method of claim 1, wherein said selection of said at least one wafer lot for metrology processing in said at least one metrology tool is based upon a metrology rule associated with said lot.

6. The method of claim 1, wherein said selection of said at least one wafer lot for metrology processing in said at least one metrology tool is based upon how recently a lot in said metrology queue was subjected to a previous process operation and a metrology rule associated with said lot.

7. The method of claim 1, wherein said selected wafer lot for metrology processing was subjected to a previous process operation and wherein said selection of said at least one of said plurality of lots to be removed from said metrology queue comprises identifying at least one wafer lot that was subjected to said process operation at a time prior to said selected wafer lot.

8. The method of claim 1, further comprising removing said at least one wafer lot selected for removal from said metrology queue.

9. The method of claim 1, further comprising limiting a number of wafer lots that may be removed from said metrology queue.

10. The method of claim 1, further comprising performing metrology operations on a plurality of additional wafer lots.

11. The method of claim 1, wherein said metrology control unit is adapted to control a plurality of metrology tools.

12. The method of claim 1, wherein said at least one metrology tool is adapted to perform at least one metrology operation comprised of at least one of measuring a critical dimension, measuring a thickness of a layer, measuring a surface planarity, measuring an electrical characteristic, measuring film resistivity, measuring film optical properties, measuring defectivity, and measuring overlay alignment.

13. The method of claim 1, further comprising identifying at least one of said plurality of lots that may not be removed from said metrology queue.

14. A method, comprising:
   providing a metrology control unit that is adapted to control metrology work flow to at least one metrology tool;
   identifying a plurality of wafer lots that are in a metrology queue wherein the wafer lots are intended to be processed in said at least one metrology tool; and
   wherein said metrology control unit:
   (a) selects at least one of said wafer lots for metrology processing in said at least one metrology tool, wherein said at least one lot selected for metrology processing was subjected to a previous process operation, and
   (b) selects at least one other of said plurality of wafer lots subjected to said process operation at a time prior to said selected at least one wafer lot to be removed from said metrology queue based upon the metrology processing of said selected at least one wafer lot in said at least one metrology tool.

15. The method of claim 14, wherein said at least one metrology tool is adapted to perform at least one metrology operation.

16. The method of claim 14, wherein each of said plurality of wafer lots has associated therewith a unique lot identification number, a time mark indicating a date and time when a previous process operation was performed on said lot, and at least one metrology rule, each rule indicating a type of metrology operation to be performed on said lot and a processing entity where a previous process operation has been performed on said lot.

17. The method of claim 14, wherein said selection of said at least one wafer lot for metrology processing in said at least one metrology tool is based upon a metrology rule associated with said selected lot.

18. The method of claim 14, further comprising removing said at least one wafer lot selected for removal from said metrology queue.

19. The method of claim 14, further comprising limiting a number of wafer lots that may be removed from said metrology queue.

20. The method of claim 14, wherein said metrology control unit is adapted to control a plurality of metrology tools.

21. The method of claim 14, further comprising identifying at least one of said plurality of lots that may not be removed from said metrology queue.

22. The method of claim 14, wherein said at least one metrology tool is adapted to perform at least one metrology operation comprised of at least one of measuring a critical dimension, measuring a thickness of a layer, measuring a surface planarity, and measuring an electrical characteristic, measuring film resistivity, measuring film optical properties, measuring defectivity, and measuring overlay alignment.

* * * * *